United States Patent Office 3,591,333
Patented July 6, 1971

3,591,333
METHOD OF CHLORINATING TITANIUM-BEARING MATERIALS
Gordon A. Carlson and Robert F. Mitchell, New Martinsville, W. Va., assignors to PPG Industries, Inc.
No Drawing. Continuation of application Ser. No. 688,677, Dec. 7, 1967. This application Apr. 30, 1970, Ser. No. 31,836
Int. Cl. C01g 23/02
U.S. Cl. 23—87                                   18 Claims

ABSTRACT OF THE DISCLOSURE

Titanium-bearing materials are chlorinated with a chlorinating agent in a fluidized bed in the presence of a carbonaceous reductant. The regulation of reaction temperatures by removal of excess heat of reaction is discussed, and a method for increasing the amount of heat generated by the reaction is proposed.

This application is a streamlined continuation application of U.S. application Ser. No. 688,677, filed Dec. 7, 1967, now abandoned.

BACKGROUND OF THE INVENTION

It is known that titanium-bearing materials can be continuously chlorinated in the presence of carbon or equivalent carbonaceous agents at elevated temperatures by continuously introducing titanium-bearing material and carbon into a suitable reactor and adding suitable chlorinating agent, e.g., chlorine, thereto at a rate sufficient to maintain a temperature within the reaction zone at which the reaction can proceed without the introduction of extraneous heat. In such process, the exothermic heat of reaction is at least sufficient to maintain the reaction on a continuous level and usually is greater than this quantity.

An especially effective method of conducting the chlorination of a titanium-bearing material involves the chlorination of such material in a fluidized or dynamic bed. In such a process, the titanium material is suspended partially or completely in an upwardly flowing stream of chlorinating gas. When the velocity of the chlorinating gas is sufficiently high, the resulting bed of reacting materials is highly turbulent and has many of the fluid characteristics of a boiling liquid, although usually having a well-defined upper surface. Because of the movement of the particles in the bed, substantially uniform temperatures tend to be established throughout the depth of the bed.

Since, for best efficiency, the exothermic heat of reaction must be sufficient to support the chlorination reaction, such exothermic heat of reaction must be greater than just the amount of heat required thermodynamically to maintain the reaction as a continuous operation in order to compensate for the substantial amount of heat loss caused by the introduction of cold reactants, heat carried off by the effluent gas steam, and heat lost to the surrounding environment by conduction, convection, and radiation. This is particularly true where the reactants are introduced at a temperature below the reaction temperature.

In developing a thermodynamic excess heat of reaction in a fluidized bed to eliminate the need for extraneous heating, overheating of portions of the reaction zone can occur. Such overheating can cause corrosion of the furnace walls, sintering of the reaction mixture and partial blockage of the device used for distribution of the chlorinating agent. Moreover, it is a characteristic of the above-described chlorination reaction to tend to drift to temperatures above the desirable range.

Regulation of the temperature in the fluidized reaction bed has been accomplished by removing the heat generated in excess of that required to maintain the reaction on a continuous level with an inert material, such as liquid titanium tetrachloride, which does not undergo chemical change during the chlorination reaction and which volatilizes at the temperature of operation and thereby absorbs undesired excess heat of reaction. In current commercial operations, where titanium tetrachloride is used to remove excess heat, the amount of pourback of titanium tetrachloride, as it is sometimes referred to, often ranges from, for example, 10 to 20 percent of the titanium tetrachloride produced.

The process of generating sufficient heat of reaction to maintain the chlorination of titanium-bearing materials as a continuous process and then removing the undesired excess exothermic heat of reaction to avoid corrosion and sintering, etc., within the reactor is further complicated because of the complex nature of a fluidized bed chlorination reaction and because this particular reaction is unstable near the point where the reaction should theoretically become self-sustaining. At this "equilibrium" condition (based on a heat balance around the reactor), control of the reaction is easily lost (due to the aforementioned instability) and the reaction becomes non-self-sustaining. At some finite level above the aforementioned equilibrium condition, a point is reached where sufficient heat is generated to insure reaction stability and the undesired excess heat is removed by, for example, pourback of the titanium tetrachloride.

The amount of exothermic heat of reaction required to insure that the chlorination reaction is self-sustaining is a function of the heat balance around the particular reactor and, therefore, is a function of the design of the reactor. For example, the smaller the reactor diameter, the larger the heat loss per unit volume of reaction space and, therefore, the greater the amount of exothermic heat of reaction required per unit quantity of reactants. The heat balance around the particular reactor is also directly related to the titanium-bearing material chlorinated. There are presently available many naturally occurring or commercially produced titaniferous ores and titanium slags or concentrates and the exothermic heat of reaction for each material varies depending on its composition.

It would be advantageous to be able to chlorinate more than one type of titanium-bearing material in a fluidized bed reactor of a particular design. Since the exothermic heats of reaction of titanium-bearing materials vary, it is thus conceivable that a particular titanium-bearing material could not be chlorinated in a fluidized bed reactor in which another titanium-bearing material with a higher exothermic heat of reaction is chlorinated because of insufficient generation of heat within the reaction zone.

In the chlorination of a titanium-bearing material in the presence of a carbonaceous reductant in a fluidized bed, both carbon dioxide and carbon monoxide are produced and found in the effluent gases. The greater the quantity of carbon dioxide produced, the larger the quantity of heat generated during the chlorination reaction. The reverse of this statement is also true, i.e., that the more carbon monoxide produced, the less heat generated within the chlorination reaction. It has now been found that the ratio of carbon dioxide to carbon monoxide produced during the chlorination of titanium-bearing materials can be raised, and, as a direct consequence, more heat is thereby generated in the chlorination reaction zone.

BRIEF SUMMARY OF THE INVENTION

It has now been discovered that the carbon dioxide-carbon monoxide ratio in the gaseous effluent produced during fluidized bed chlorination of titanium-bearing materials in the presence of a carbonaceous reductant can be increased by adding a source of metallic element selected from the group consisting of magnesium, calcium, strontium, barium, cadmium and mixtures thereof sufficient to increase said ratio but less than an agglutinating amount to the fluidized bed.

DETAILED DESCRIPTION

The present invention for increasing the carbon dioxide-carbon monoxide ratio is applicable to the chlorination of titanium-bearing materials such as titaniferous ores, slags, concentrates, etc. in a fluidized bed. Such materials are well known in the art and include titaniferous ores, such as ilmenite, rutile, arizonite and leucoxene; titanium slags and concentrates produced by various conventional smelting of titaniferous ores composed largely of the oxides of titanium and iron, with carbon and alkali or alkaline earth slag formers; as well as other commercially available sources of titanium that are fluidizable, i.e., capable of being fluidized and maintaining such condition during the chlorination reaction. It should be here noted that certain titaniferous ores, such as titanite and perovskite contain such a large amount of minerals other than titanium oxide that the ore cannot be satisfactorily fluidized or, if fluidizable, will not retain this state under chlorination conditions because of the chlorination of such minerals to chlorides which remain in the bed and interfere with fluidization. Of particular utility are titaniferous ores containing in excess of 70 weight percent, preferably in excess of 90 weight percent, titanium oxide. The present invention is particularly applicable to the continuous fluidized bed chlorination of rutile, such as Australian rutile, and especially Sierra-Leone rutile. The titanium oxide-bearing materials used in such fluidized bed chlorination will typically have a particle size in the range of from about 75 to about 500 microns and preferably will have an average particle size of from about 75 to 200 microns.

The carbonaceous reductant utilized in fluidized bed chlorination of titanium-bearing materials can be any carbon-containing reducing agent that is substantially hydrogen-free since the presence of hydrogen results in the formation of hydrogen chloride which increases the consumption of chlorine and presents a further corrosion problem. Typically, coke and carbon monoxide are employed; however, other carbon-containing reducing agents, such as graphite, charcoal, carbon tetrachloride and phosgene can be employed. The latter two can serve a dual purpose and also act as the chlorinating agent. The amount of carbonaceous reductant admixed with the titanium-bearing material will vary according to other conditions such as, for example, the oxygen content of the chlorinating gas, e.g., chlorine, fed to the reactor. However, it is usually sufficient to provide a carbon content in the fluidized bed of from about 10 to about 50 percent by weight of the total composition of the bed, usually 10 to about 30 weight percent. In the chlorination of rutile, for example, the carbon content of the bed is usually about 20 weight percent. The carbonaceous material, if it is solid, will have an average particle size of approximately 100 to 900 microns, and often will have a wide particle size distribution. Of particular utility is carbonaceous material that has a particle size range from 20 to 80 mesh (Tyler Standard Screen).

The chlorination temperature of titanium-bearing materials will typically be at temperatures above 500° C., e.g., from about 700 to about 1100° C. Chlorination temperatures of rutile usually vary from about 800 to about 1000° C., e.g., about 950° C.

In the initiation and operation of a typical fluidized bed process for the chlorination of titanium-bearing materials, such as rutile, the reactor furnace is charged with a mixture of titanium-bearing material and carbonaceous reductant, usually from a hopper, until a bed of, for example, from about 1 to 6 feet in height, depending on the particular reactor, is established. The reactor is then brought up to the desired temperature in any convenient way. For example, coke or other carbonaceous material can be burned within the reactor until the desired temperature is attained. Air or nitrogen is introduced through the bottom of the reactor during heat up to fluidize the titanium-bearing material-carbon mixture and after fluidization is accomplished and heat up completed, chlorine is gradually substituted as the fluidizing agent. The chlorine thus introduced chlorinates the metal components of the bed, forming and vaporizing titanium tetrachloride, as well as other vaporizable metal halide components. These chlorides, together with any other gaseous components, such as carbon dioxide and carbon monoxide, formed during the chlorination reaction, are carried away from the reaction zone and out through the top of the reactor and forwarded to a condensation zone. There, the uncondensable components of the effluent gas stream are separated from the condensable components. The condensables of the effluent gas stream, e.g., titanium tetrachloride, iron chloride, etc., are then sent to a purification and further separation zone wherein purified titanium tetrachloride is eventually recovered as the principal product. The uncondensables are forwarded to a scrubbing zone to remove any noxious components, e.g., chlorine, and then vented to the atmosphere. Typically, chlorine utilization and titanium oxide conversion to the chloride in such a process is greater than 90 percent, often greater than 99 percent.

The chlorination of a titanium-bearing material is accomplished by any suitable chlorinating agent, e.g., typically chlorine or source of chlorine. However, other suitable chlorinating agents such as phosgene, carbon tetrachloride, sulfur chloride, etc., can be employed. Typically, the chlorinating agent is substantially anhydrous because the presence of water in the system creates serious corrosion problems due to the formation of hydrochloric acid. Titanium tetrachloride-water mixtures are extremely corrosive and are avoided whenever possible. The temperature of the chlorinating agent introduced into the reactor can range from ambient temperature to temperatures approaching that present within the reactor. However, ambient temperatures are typically utilized for economic reasons.

To implement the present invention, the effluent gas stream removed from the fluidized bed reactor is analyzed for carbon dioxide and carbon monoxide content. This can be performed conveniently by analyzing the non-condensable gases downstream from the condensing section. If the carbon dioxide-carbon monoxide ratio is found to be at a level below that desired, it is increased by the addition to the fluidized bed of an amount of metallic element selected from the group consisting of magnesium, calcium strontium, barium, cadmium and mixtures thereof sufficient to increase said ratio but less than an amount which will, or tend to, agglutinate the fluidized bed. Of particular utility are the metallic elements, magnesium, calcium and mixtures thereof.

Although not wishing to be bound by any particular theory, it is believed that the effect of the addition of the aforementioned metallic elements is to repress or inhibit the production of carbon monoxide in the chlorination reaction which thereby results in an increase of the carbon dioxide-carbon monoxide ratio. As a result of the increased production of carbon dioxide relative to carbon monoxide, the exothermic heat of reaction also increases. Aside from having a higher exothermic heat of reaction, which permits the attainment of a self-sustaining reaction more easily, the increased carbon dioxide-carbon monoxide ratio permits the use of less carbonaceous reductant. Therefore, such chlorination reaction becomes more economical by a reduction in the quantity of carbonaceous reductant used.

It is most surprising to find that the addition of metallic elements, such as calcium and magnesium, could increase the efficiency and economics of the chlorination of titanium materials, such as rutile, because the chlorides of these elements have long been thought to be impurities that cause difficulties in operating a fluidized bed reactor of the type described. The chlorides of metals, such as magnesium and calcium, especially calcium, tend to remain in the fluidized bed instead of becoming vaporized and removed with effluent gaseous stream. The accumulation of such chlorides can lead to difficulties in maintaining a fluidized condition of the reactor bed and can cause a process shutdown for cleaning and extraction of such materials if they are not otherwise eliminated or rendered innocuous.

The metallic elements employed in the present invention to modify the carbon dioxide-carbon monoxide ratio in the effluent gases can be introduced into the fluidized bed by means of any source material or compound furnishing such metallic elements. If the metallic elements are introduced by means of carrier or compound of such element, the carrier or compound of reduced elements thereof should be inert with respect to the chlorination of the titanium-bearing material and also innocuous with respect to efficient operation of the fluidized bed. Examples of salts or compounds that can be utilized to furnish the metallic elements described above include the carbonates, sulfates, chlorides, oxides, phosphates, and carbides of the individual elements. The elements, as free metal, can also be used. Of particular use are the carbonates, chlorides and oxides of the metallic elements named.

Other source materials or compounds that provide the aforementioned metallic elements are included in the scope of the present invention. For example, titanium-bearing materials, e.g., ores, slags or concentrates, other than the particular material being chlorinated, can be used as a source of the particular metallic element or mixtures of metallic elements selected for use provided that such source contains more of said selected element(s) (individually or totally) than is present in the principal titanium material being chlorinated. Where two or more metallic elements are used as the additive, the source thereof need contain more of only one of the additives. Of particlular utility in this embodiment is the use of Australian rutile as a source of calcium and magnesium additive in the chlorination of Sierra-Leone rutile. Australian rutile contains about ten times the amount of magnesium and about twice the amount of calcium as Sierra-Leone rutile. Titanium slags or concentrates can contain even greater amounts of such alkaline earth elements because of the method of their preparation.

The metallic elements or compounds thereof utilized in the present process can be added to the fluidized bed in any convenient manner. For example, they can be added with the titaniferous ore or separately by means of a suitable inlet. Furthermore, the addition can be intermittent or continuous as desired. In the former case, a larger quantity will, of course, be added; however, regardless of the frequency of addition, the amount added per unit of time will be substantially the same. It has been found advantageous in the chlorination of rutile to add the metallic element additive once a shift or even once a day since the amount required for a time period, such as 24 hours, does not appear to have an adverse affect on the chlorination reaction during initial periods of operation and is effective for the entire period of operation.

The amount of metallic element selected from the group consisting of magnesium, calcium, strontium, barium, cadmium and mixtures thereof added, as additive, to the fluidized bed is that amount required to increase the carbon dioxide-carbon monoxide ratio in the effluent gases removed from the fluidized bed reactor. Stated other ways, such amount is that sufficient to increase the exothermic heat of reaction, that amount sufficient to inhibit the production of carbon monoxide in the chlorination reaction, or that amount sufficient to increase the production of carbon dioxide relative to carbon monoxide. Typically, such amount will vary from about 0.001 to about 0.35 weight percent (calculated as free metal) based on the amount of titanium oxide in the titanium-bearing material. Preferably, from about 0.004 to about 0.05 weight percent is employed. Care should, of course, be observed in the chlorination of titanium-bearing materials, such as slags, which have a relatively high concentration of the alkaline earths, e.g., calcium and magnesium, to prevent any agglutination of the bed, i.e., the introduction of an excessive amount of the above-described metallic elements can interfere with the fluidization of the reactor bed.

The present invention can, therefore, be utilized to reduce the amount of carbonaceous reductant required in the chlorination of titanium-bearing materials, such as rutile. This is accomplished by the increased production of carbon dioxide relative to carbon monoxide. The carbon dioxide/carbon monoxide ratio at which the continuous fluidized bed chlorination of titanium-bearing materials is self-sustaining varies with the titanium-bearing material chlorinated and the particular design of the reactor employed. For example, a carbon dioxide/carbon monoxide of about 2 may be sufficient for one type of reactor and insufficient for another. Typically, the carbon dioxide/carbon monoxide ratio in the described process will vary from about 1.0–5.

The present process is more particularly described in the following examples which are intended as illustrative only since numerous modifications and variations thereof will be apparent to those skilled in the art.

Example I

In the following example, Australian rutile and Sierra-Leone (Sherbro) rutile were chlorinated in a two-inch diameter quartz reactor surrounded by an electric heater. A hopper and screw feeder for continuous introduction of feed were connected to the top of the reactor. A fritted disc near the bottom of the reactor supported the initial bed charge and permitted the introduction of the fluidizing gas. A gaseous feed line that was connected at the bottom of the reactor below the fritted disc was connected at its opposite end to a T-valve to allow the introduction of either nitrogen or chlorine to the bottom of the reactor. Effluent gases were removed from the top of the reactor into a titanium tetrachloride condenser maintained at about −12 to −18° C. A gas sample port was placed at the exit of this condenser. The uncondensables from the titanium tetrachloride condensation zone were then forwarded to a potassium hydroxide scrubber and vented. The chemical analysis of Sherbro and Australian rutile is tabulated in Table I.

TABLE I.—CHEMICAL ANALYSIS OF SHERBRO AND AUSTRALIAN RUTILE (WT. PERCENT)

| Component | Sherbro rutile | Australian rutile |
|---|---|---|
| $TiO_2$ | 96.77 | 95.18 |
| $ZrO_2$ | 0.68 | 0.60 |
| $V_2O_5$ | 0.78 | 0.38 |
| $SiO_2$ | 0.13 | 0.82 |
| $Nb_2O_5$ | 0.14 | 0.38 |
| $Cr_2O_3$ | 0.26 | 0.37 |
| FeO | 0.49 | 0.68 |
| $Al_2O_3$ | 0.25 | 0.27 |
| CaO | 0.0063 | 0.011 |
| MgO | 0.0082 | 0.075 |
| Sr | 0.01 | <0.01 |
| Sn | <0.01 | 0.04 |
| MnO | <0.007 | 0.009 |

In the chlorination of Australian and Sherbro rutile, the initial bed charge was composed of 800 grams of rutile and 200 grams of Mountaineer Carbon calcined petroleum coke. The coke was composed of about 98 weight percent carbon, 1½ weight percent sulfur and about ½ weight percent ash. The starting bed was brought to a reaction temperature of about 925° C. under a fluidizing nitrogen flow equal to that of the chlorine rate to be used for the chlorination. After fluidization was established at about 925° C., chlorine was gradually substituted for the nitrogen until 100 percent chlorine flow was obtained. Chlorine flow was about 77 pounds per hour per square foot of cross-sectional area of reactor. Gas samples were taken at least every hour and occasionally more often in order to obtain chlorine, carbon dioxide and carbon monoxide analyses. The reactor was continuously charged throughout the run with a feed of 85 parts of rutile and 15 parts of coke at a rate gaged to keep the fluidized bed at approximately the same height as the initial bed, e.g., over a half-hour, 212.5 grams of rutile and 37.5 grams of coke were added. The chlorinations were conducted for six hours and the results are tabulated in Table II.

TABLE II.—RESULTS OF SIX-HOUR CHLORINATIONS OF SHERBRO AND AUSTRALIAN RUTILES

| Run No. | Type rutile charge | $TiO_2$ conversion, percent | Percent free $Cl_2$ | Vent gas analyses, $CO_2/CO$ | | | | | | Average (arithmetic) |
|---|---|---|---|---|---|---|---|---|---|---|
| | | | | 1 hr. | 2 hrs. | 3 hrs. | 4 hrs. | 5 hrs. | 6 hrs. | |
| 1 | Australian | >99 | 0 | 2.7 | 2.3 | 2.7 | 3.2 | 3.4 | 3.7 | 3.0 |
| 2 | Sherbro | >99 | 0 | 1.6 | 1.8 | 1.9 | 2.1 | 2.2 | 2.4 | 2.0 |

The data of Table II show that the average carbon dioxide/carbon monoxide ratio in the effluent gas stream is significantly lower for Sherbro rutile than for Australian rutile under the same chlorination conditions. The data, therefore, illustrate that $CO_2/CO$ ratios will vary depending on the type of titanium-bearing material chlorinated.

Example II

In accordance with the operating procedures of Example I, Sherbro rutile was chlorinated in the presence of different quantities of calcium oxide and magnesium oxide. The oxides were added separately to an initial bed charge of 800 grams of rutile and 200 grams of coke, and were not mixed with the rutile-coke mixture continuously fed to the reactor. The results are tabulated in Table III.

longed period at a bed temperature of 950° C. and a chlorine flow of 100 pounds per hour per square foot of cross-sectional area of reactor. Calcium was added to the bed as calcium oxide in an amount of 0.1 and 0.3 weight percent (calculated as the oxide and based on the amount of rutile in the starting 1000 gram bed charge). In the run employing 0.3 percent calcium oxide additive, an additional 0.1 weight percent calcium oxide was added when the $CO_2/CO$ ratio started to drop at 23 hours. An immediate increase in $CO_2/CO$ ratio was observed. In the run employing 0.1 weight percent calcium oxide in the initial bed charge, 0.05 weight percent calcium oxide based on the amount of rutile in the initial bed charge, was added after 8 and 10 hours in order to observe the effect on the $CO_2/CO$ ratio. The initial 0.1 percent calcium oxide present at the start of the chlorination run produced a $CO_2/CO$ ratio of 3 after seven hours. Following the two subsequent additions of 0.05 percent calcium oxide, the $CO_2/CO$ ratio increased to 4.3 at the end of 16 hours and then leveled off to about 3.2 at the end of 21 hours of the 24-hour run. Feed to the reactor consisted of all Sherbro rutile; however, extra coke was added during each run as deemed necessary by the $CO_2/CO$ mole ratio being obtained in an effort to maintain the bed near the

TABLE III.—RESULTS OF CHLORINATING SHERBRO RUTILE-CONTAINING ADDITIVES

| Run No. | Additive, percent [a] | | Vent gas analyses, $CO_2/CO$ | | | | | | Average (arithmetic) |
|---|---|---|---|---|---|---|---|---|---|
| | CaO | MgO | 1 hr. | 2 hrs. | 3 hrs. | 4 hrs. | 5 hrs. | 6 hrs. | |
| 3 | [b] 0.1 | | 2.1 | 2.2 | 2.7 | 2.9 | 3.4 | 3.3 | 2.8 |
| 4 | 0.3 | | 2.2 | 2.6 | 2.7 | 2.8 | 3.3 | 3.4 | 2.8 |
| 5 | | [c] 0.3 | 2.1 | 2.3 | 2.5 | 2.3 | 2.5 | 2.9 | 2.4 |

[a] Additive (calculated as the oxide) is expressed as a percent of the rutile in the original bed charge (800 grams).
[b] About 0.073 weight percent calcium based on titanium oxide in the rutile ore.
[c] About 0.19 weight percent magnesium based on titanium oxide in the rutile ore.

The data of Table III show that the addition of 0.1 weight percent calcium oxide based on the amount of rutile in the original bed charge increases the average $CO_2/CO$ ratio in a six-hour chlorination run from 2.0 to 2.8. (Compare Run No. 3 of this example with Run No. 2 in Example I.) The data also show that the addition of 0.3 weight percent calcium oxide did not significantly alter the $CO_2/CO$ ratio during the six-hour chlorination run and produced an arithmetic average of exactly the same as when 0.1 weight percent calcium oxide was used. Thus, the use of an excessive amount of additive does not significantly improve the $CO_2/CO$ ratio and, therefore, is economically not preferred. Finally, the data show that the addition of magnesium oxide to the initial bed charge also increases the $CO_2/CO$ ratio. Although the arithmetic average utilizing magnesium as the additive is slightly lower than that found when using calcium, it should be noted that the end of six hours, the $CO_2/CO$ ratio was as high as 2.9.

Example III

In accordance with the operating procedures described in Example I, Sherbro rutile was chlorinated over a prolonged period starting level of 20 percent coke. The results of these runs are tabulated in Table IV.

TABLE IV

| Run | Type rutile | Run duration (hrs.) | Grams calcium added as CaO | Average $CO_2/CO$ |
|---|---|---|---|---|
| 6 | Sherbo (as received) | 12 | | 1.9 |
| 7 | Sherbo (0.1% CaO) | 24 | 1.144 | 3.1 |
| 8 | Sherbo (0.3% CaO) | 24 | 2.287 | 3.3 |

The data of Table IV show that the addition of 0.3 weight percent calcium as calcium oxide to the initial bed charge based on the amount of rutile in the initial charge was sufficient to produce an average $CO_2/CO$ ratio of 3.3 in contrast to the average ratio of 1.9 produced without the additive. The initial charge was sufficient to maintain the $CO_2/CO$ ratio above 3.0 for 22 hours. The data of Table IV also show that the addition of 0.1 weight percent calcium oxide is sufficient to increase the $CO_2/CO$ ratio significantly over that obtained without any additive.

Example IV

In a manner analogous to Example II, 0.3 weight percent of strontium oxide, barium oxide and cadminum oxide, based on the amount or rutile in the initial bed charge, are individually added to six-hour Sherbro rutile chlorination runs. In each run, the particular additive increases the $CO_2/CO$ ratio in the effluent gas stream.

Example V

Two rutile chlorinations, in a manner analogous to Example I, were performed except that the rutile charges consisted of (a) 50 weight percent Sherbro rutile and 50 percent Australian rutile and (b) 75 percent Sherbro rutile with 25 percent Australian rutile. Reference to Table I illustrates that Australian rutile contains about ten times the amount of magnesium and about two times the amount of calcium contained in Sherbro rutile. Thus, the Australian rutile provides a source of additional calcium and magnesium above that contained in the Sherbro rutile. In Run 9 (Table V), the amount of excess (as additive) calcium and magnesium metal supplied by the Australian rutile was calculated to be about 0.023 weight percent based on the total amount of titanium oxide in the rutile. In Run 10 (Table V), the amount of calcium and magnesium metal supplied by the Australian rutile as additive was calculated to be about 0.011 weight percent. The results of these two chlorination runs are contained in Table V.

TABLE V

| Run No. | Type rutile | Vent gas analyses, $CO_2/CO$ | | | | | | Average (arithmetic) |
|---|---|---|---|---|---|---|---|---|
| | | 1 hr. | 2 hrs. | 3 hrs. | 4 hrs. | 5 hrs. | 6 hrs. | |
| 9 | Sherbro (50%)–Australian (50%) | 2.1 | 2.9 | 3.7 | 3.9 | 4.4 | 4.8 | 3.6 |
| 10 | Sherbro (75%)–Australian (25%) | 1.9 | 2.0 | 2.5 | 3.0 | 3.5 | 3.4 | 2.7 |

Example VI

In a manner analogous to Example III, a rutile mixture of 90 percent Sherbro rutile and 10 percent Australian rutile was chlorinated for 28½ hours. The amount of excess (as additive) calcium and magnesium metal supplied by the Australian rutile based on the amount of titanium oxide in the rutile charge was calculated to be about 0.0045 weight percent. The results are tabulated in Table VI.

TABLE VI.—VENT GAS ANALYSES ($CO_2/CO$)

Run No. 11 [1, 2]

| | |
|---|---|
| 1 hour | 1.5 |
| 3 hours | 1.9 |
| 6 hours | 2.2 |
| 9 hours | 3.0 |
| 12 hours | 3.5 |
| 15 hours | 3.6 |
| 18 hours | 3.1 |
| 21 hours | 3.5 |
| 24 hours | 4.1 |
| 27 hours | 3.7 |
| Average (arithmetic) | 31 |

[1] Type rutile—Sherbro (90%), Australian (19%).
[2] Run duration—28½ hours.

The data of Tables V and VI show that a variety of sources of additional calcium and magnesium can be utilized to increase the $CO_2/CO$ ratio in the effluent gases of a rutile chlorination produced by the chlorination of a titanium-bearing material such as rutile.

Example VII

In a manner analogous to Example II, chlorination of Sherbo rutile was attempted in the presence of 0.3 weight percent calcium oxide and 0.3 weight percent magnesium oxide based on the initial charge of rutile. At the onset of the chlorination, difficulty was had in achieving proper fluidization of the bed and such result was never attained. The fluidized bed became sticky and agglutinized. The run was terminated and the reactor cleaned.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

We claim:

1. In a process for the production of titanium tetrachloride by fluidized bed chlorination of fluidizable titanium-bearing material in the presence of carbonaceous reductant wherein carbon dioxide and carbon monoxide are produced during the chlorination reaction, the improvement which comprises conducting the chlorination in the presence of an added amount of a source of metallic element selected from the group consisting of magnesium, calcium, strontium, barium, cadmium and mixtures thereof sufficient to produce an increased carbon dioxide/carbon monoxide ratio but less than an agglutinating amount.

2. The process of claim 1 wherein the titanium-bearing material is a rutile ore.

3. The process of claim 2 wherein the rutile ore is Sierra Leone rutile ore.

4. The process of claim 1 wherein the added metallic element is selected from the group consisting of calcium, magnesium and mixtures thereof.

5. The process of claim 1 wherein the amount of metallic element added ranges between about 0.001 and about 0.35 weight percent (calculated as free metal) based on the amount of titanium oxide present in the titanium-bearing material.

6. The process of claim 5 wherein the amount of metallic element added ranges between about 0.004 and about 0.05 weight percent.

7. In a process for the continuous production of titanium tetrachloride by fluidized bed chlorination of fluidizable titanium-bearing material in the presence of carbon-containing reductant at temperatures greater than 700° C., wherein carbon dioxide and carbon monoxide are produced during the chlorination reaction, the improvement which comprises adding a source of metallic element selected from the group consisting of calcium, magnesium and mixtures thereof to the fluidized bed in an amount sufficient to produce an increased carbon dioxide/carbon monoxide ratio but less than an agglutinating amount.

8. The process according to claim 7 wherein the carbon-containing reductant is coke.

9. The process according to claim 7 wherein the metallic element source is the oxide of the metallic element.

10. The process according to claim 7 wherein the titanium-bearing material is Sierra Leone rutile and the metallic element source is Australian rutile.

11. The process according to claim 7 wherein a mixture of calcium and magnesium is added to the fluidized bed and the source of said mixture is a titaniferous ore having a greater combined concentration of calcium and magnesium than that contained in the principal titanium-bearing material being chlorinated.

12. In the continuous production of titanium tetrachloride by fluidized bed chlorination of fluidizable titanium-bearing material in the presence of a carbon-containing reducing agent wherein carbon dioxide and carbon monoxide are produced during the chlorination reaction, the improvement which comprises conducting the chlorination in the presence of an added amount of a source of metallic element selected from the group consisting of calcium, magnesium, strontium, barium, cadmium and mixtures thereof sufficient to retard the production of carbon monoxide but less than an amount sufficient to agglutinate the fluidized bed.

13. In the continuous production of titanium tetrachloride by fluidized bed chlorination of fluidizable titaniferous ore in the presence of a carbon-containing reducing agent at temperatures greater than 700° C. wherein carbon dioxide and carbon monoxide are produced during the chlorination reaction, the improvement which comprises conducting the chlorination reaction in the presence of an added amount of a source of metallic element selected from the group consisting of magnesium, calcium, strontium, barium, cadmium and mixtures thereof sufficient to produce an increased exothermic heat of reaction but less than an amount which will agglutinate the fluidized bed.

14. The process according to claim 13 wherein the carbon-containing reducing agent is substantially hydrogen-free.

15. In a process for the continuous production of titanium tetrachloride by fluidized bed chlorination of fluidizable titanium-bearing material in the presence of carbon-containing reductant in a reactor wherein carbon dioxide and carbon monoxide are produced and removed from the reactor during the chlorination reaction, the improvement which comprises analyzing the reactor effluent stream for carbon dioxide and carbon monoxide and, in response to said analysis, adding to said fluidized bed a source of metallic element selected from the group consisting of magnesium, calcium, strontium, barium, cadmium and mixtures thereof in an amount sufficient to increase the carbon dioxide/carbon monoxide ratio in the reactor effluent stream but less than an agglutinating amount.

16. The process according to claim 15 wherein the amount of metallic element added is between about 0.001 and about 0.35 weight percent (calculated as free metal) based on the amount of titanium oxide present in the titanium-bearing material.

17. A process according to claim 16 wherein the titanium-bearing material contains in excess of 70 weight percent titanium oxide.

18. The process according to claim 17 wherein the titanium-bearing material is Sierra Leone rutile.

References Cited

UNITED STATES PATENTS

| | | | |
|---|---|---|---|
| 2,555,374 | 6/1951 | Rowe et al. | 23—87 |
| 2,622,005 | 12/1952 | Aagaard et al. | 23—87 |
| 2,701,179 | 2/1955 | McKinney | 23—87 |
| 2,701,180 | 2/1955 | Krchma | 23—87 |
| 2,777,756 | 1/1957 | Anazawa et al. | 23—87X |
| 2,784,058 | 3/1957 | Hair | 23—87 |
| 2,790,703 | 4/1957 | Frey | 23—87 |
| 2,842,425 | 7/1958 | Anderson | 23—87 |
| 2,962,353 | 11/1960 | Haimsohn | 23—87 |
| 2,974,009 | 3/1961 | Bashour et al. | 23—87 |

EDWARD STERN, Primary Examiner

U.S. Cl. X.R.

23—87